Dec. 22, 1942.     H. W. SHONNARD     2,306,284
APPARATUS FOR TRANSPORTING FREIGHT
Original Filed Dec. 17, 1938     6 Sheets-Sheet 1
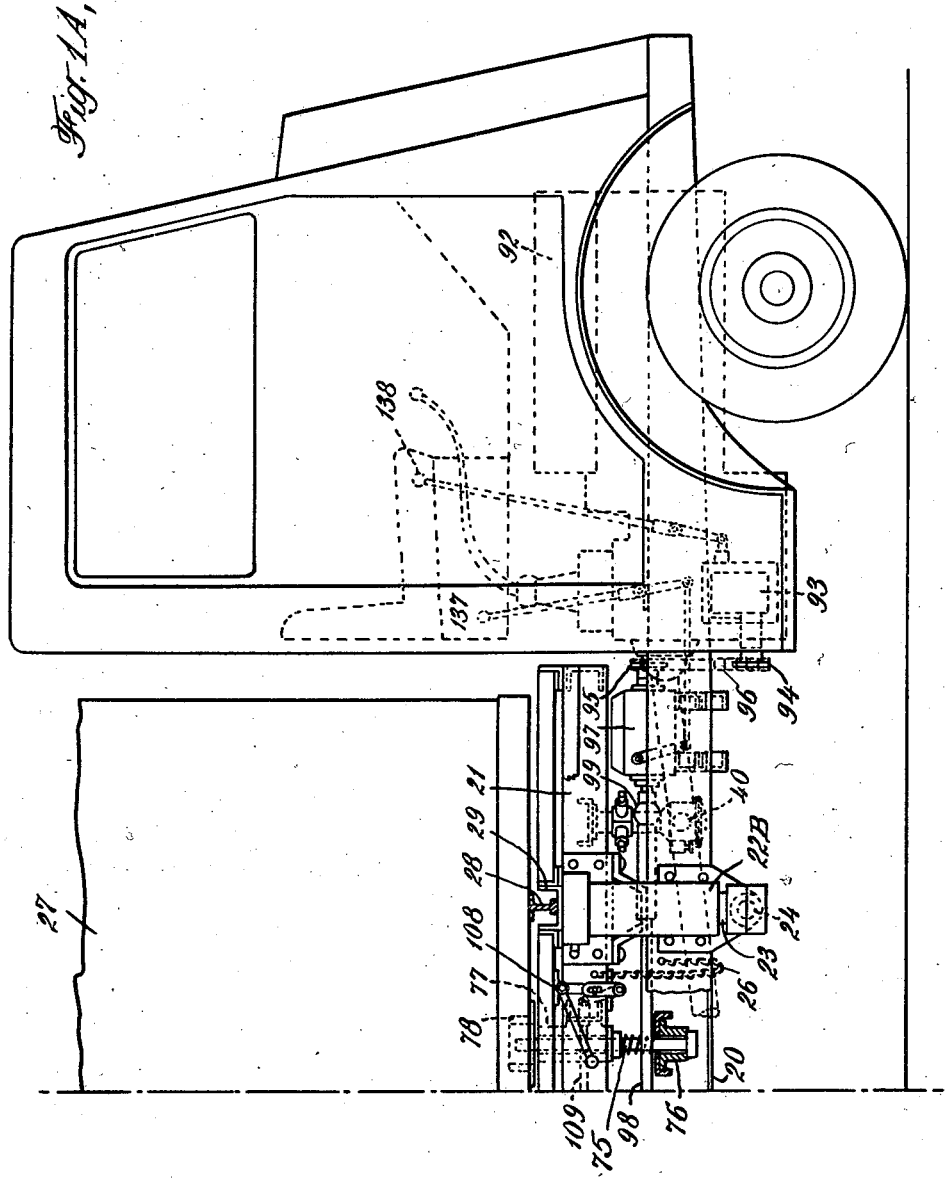
INVENTOR
Harold W. Shonnard
BY
Marshall & Hawley
ATTORNEYS

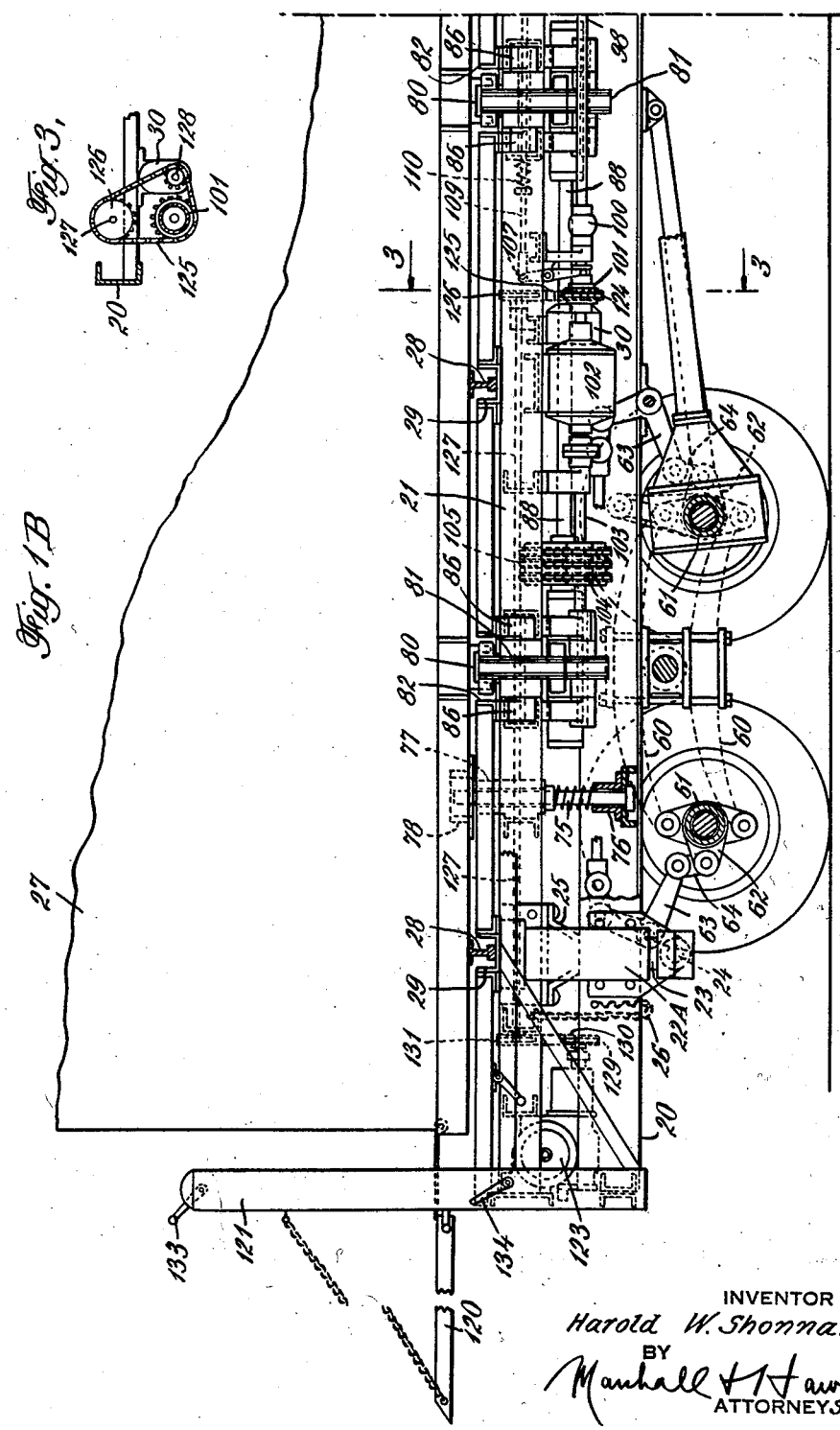

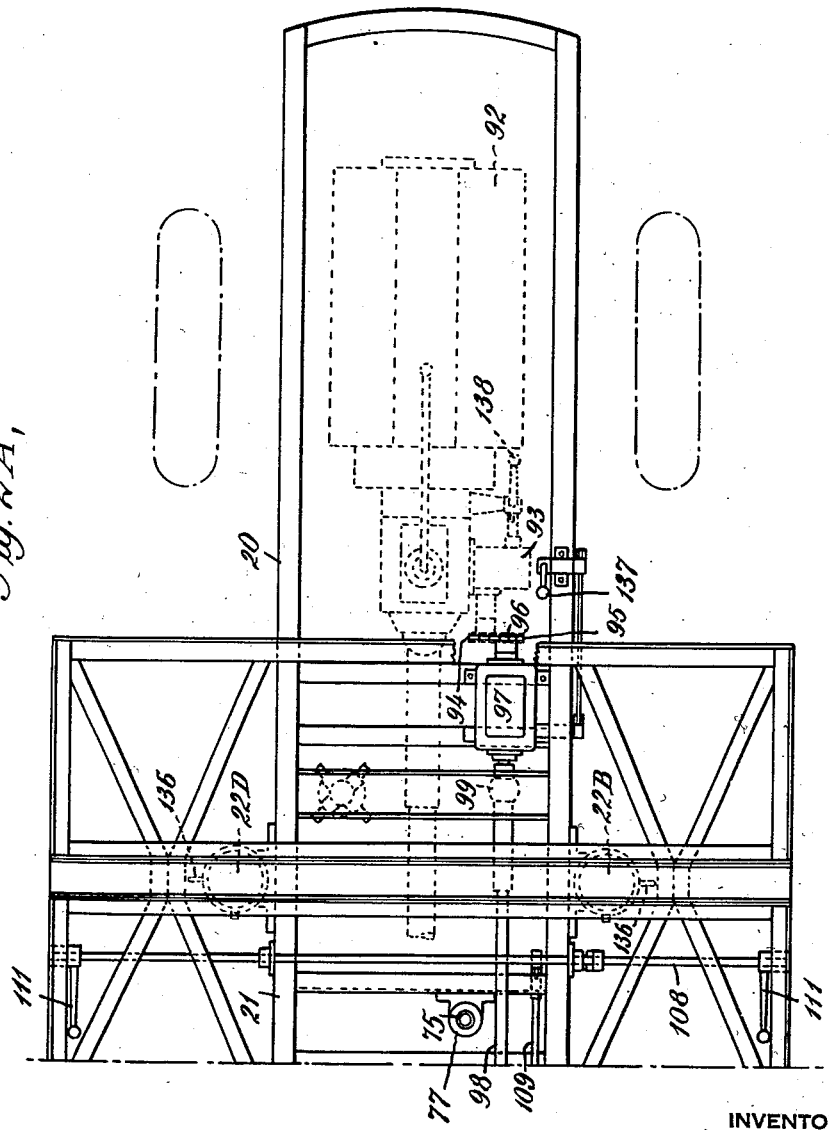

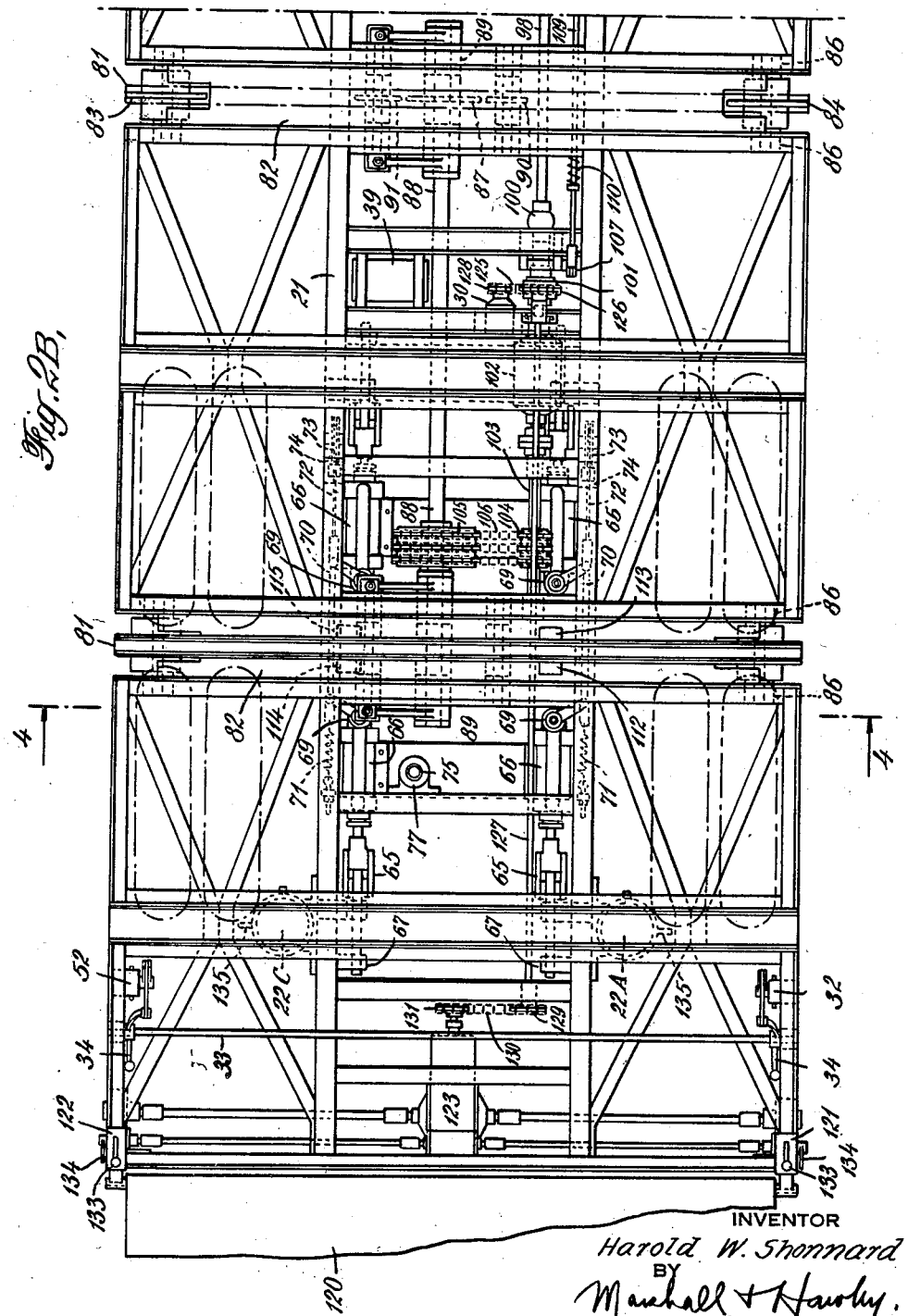

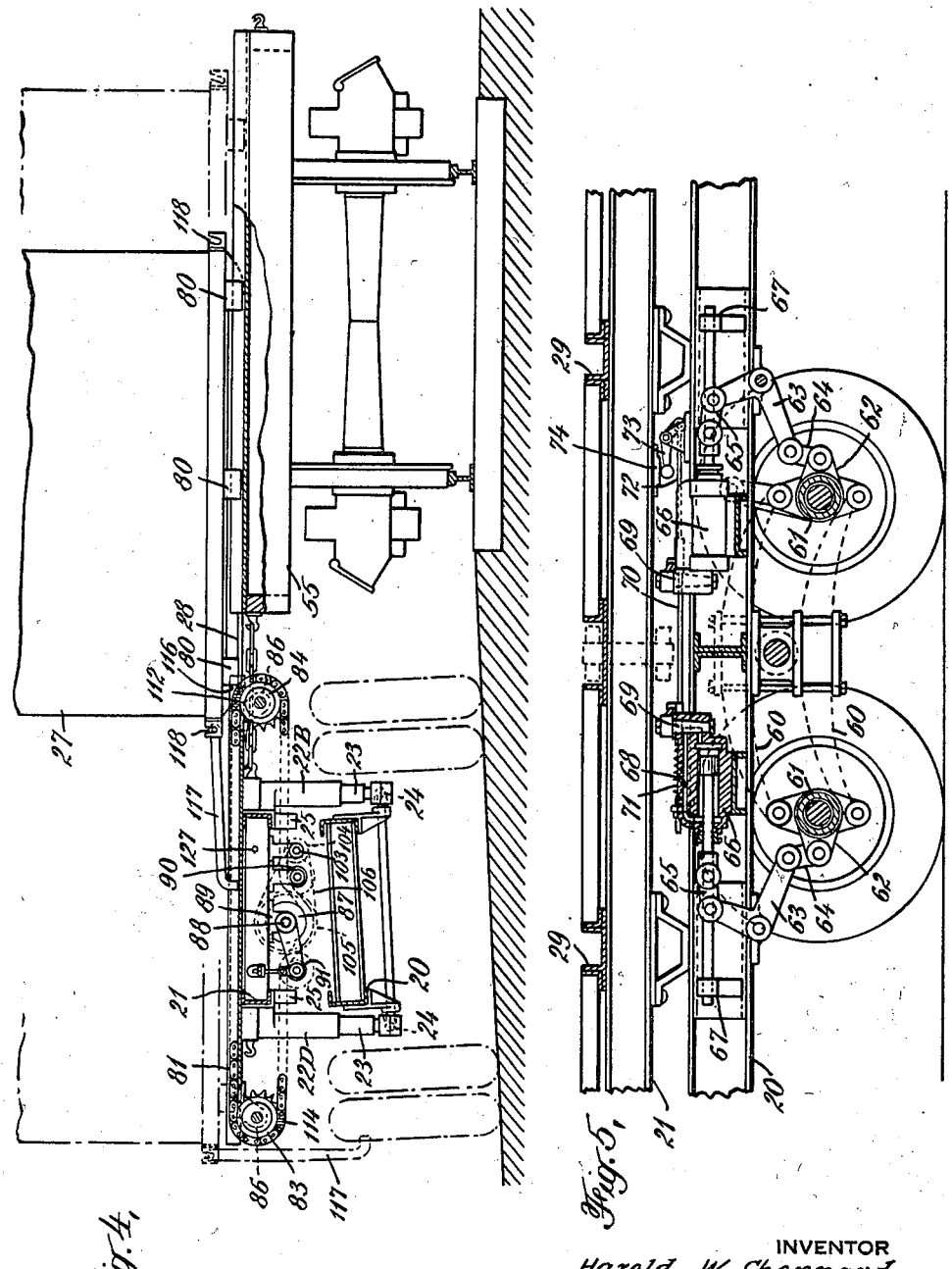

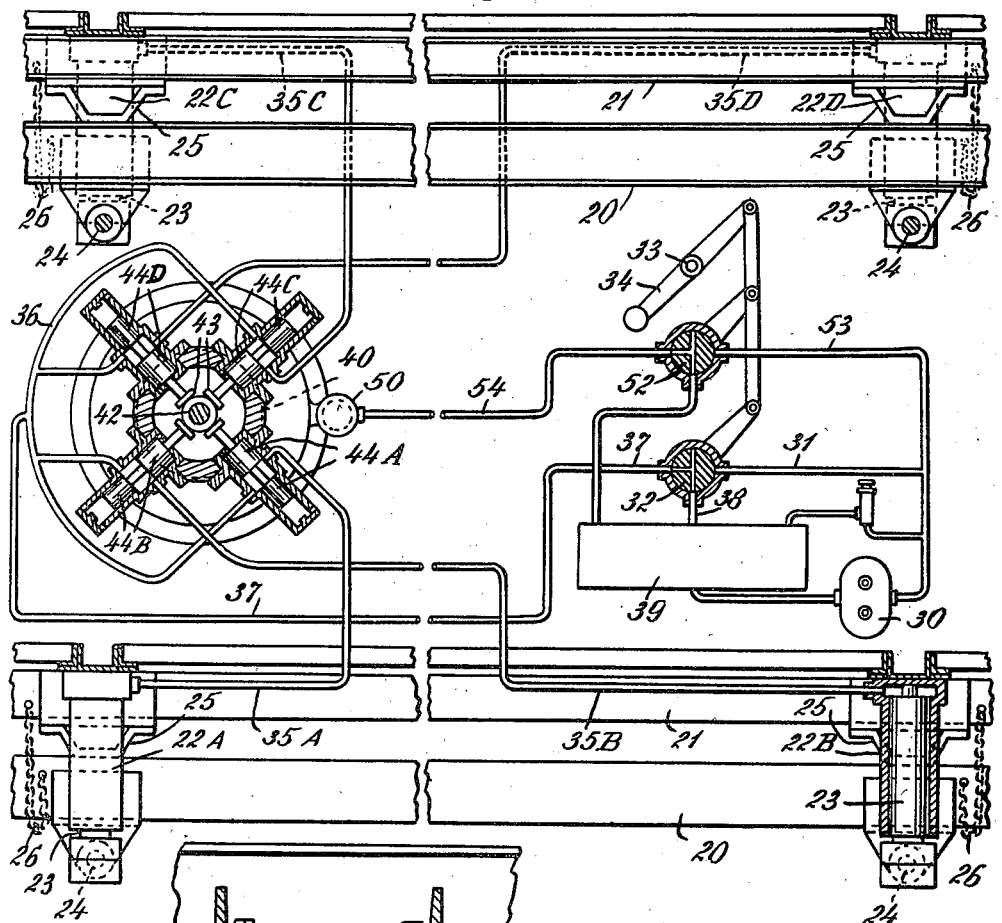
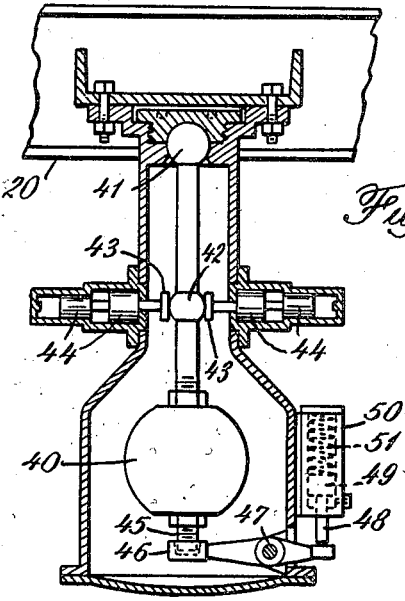

Patented Dec. 22, 1942

2,306,284

UNITED STATES PATENT OFFICE 2,306,284

APPARATUS FOR TRANSPORTING FREIGHT

Harold W. Shonnard, Montclair, N. J.

Original application December 17, 1938, Serial No. 246,318. Divided and this application July 2, 1940, Serial No. 343,527

13 Claims. (Cl. 214—65)

This invention relates to apparatus for transporting freight.

Its object is to increase the efficiency in the transportation of freight from its point of origin to its ultimate destination, by consolidating less than carload lots into substantially carload containers for transportation by railway, transferring such carload shipments at railway terminals or at rail sidings to highway vehicles arranged to make sidewalk delivery of heavy divisions of the freight contents of such containers.

A part of such apparatus pertains to means for moving transferrable bodies or freight containers horizontally from one to another substantially parallel vehicles spaced apart from each other, one of which vehicles may be a motor truck or a tractor-trailer type of vehicle, herein designated as a transfer vehicle, on which means is provided for moving the transferrable body transversely to the right or left of the transfer vehicle a distance exceeding the width of the transfer vehicle to transport position on an adjacent vehicle, or from an adjacent vehicle, or to or from a platform.

Another object is to provide means for raising or lowering such a container on a vehicle to the height of the floor of an adjacent vehicle or platform and to provide means for automatically maintaining such a container in a substantially horizontal position regardless of the grade of the road beneath the vehicle.

Further objects are to provide means for preventing vertical movement of the vehicle springs while taking on or discharging a container, to provide means for automatically locking the container in position on the vehicle and to provide power operating means for raising and lowering freight to and from a removable container on the vehicle.

These and other objects of the invention will appear in the following specification in which I will describe the invention, the novel features of which will be pointed out in appended claims. This application is a division of my application Ser. No. 246,318, filed Dec. 17, 1938.

Records show that the extensive use of motor vehicles for the transportation of L-C-L (less than carload) shipment of freight over the highways is largely responsible for the decline in railway freight revenues. In 1935, under the direction of the Federal Coordinator of Transportation, an exhaustive study of the subject was made and published under date of June 15, 1936. From data published in that report it is apparent that neither present railway L-C-L freight handling methods, nor their facilities, are adapted to compete with high way transportation.

It has been demonstrated that it is entirely practical to collect and consolidate L-C-L shipments into large containers and to transfer such containers from highway vehicles to railway cars through the use of gantries or jib-cranes and that experience has shown that such cranes are not sufficiently flexible and are very costly, and therefore, having in mind that the railway tariff on container (substantially carload shipments) is very much lower than for shipments of unconsolidated freight, it is apparent that highway operators using equipment of the type herein described can avail themselves of carload rail rates for long haul shipments accepted by them at L-C-L rates.

It is one of the objects of this invention to provide for the packing of containers in the order of consignee distribution, in order that delivery of the contents of shipped containers may be made directly to respective consignees; the cycle of delivery being that the containers are transferred at the rail terminal to local delivery vehicles which discharge the contents of the containers on their routes, according to the sequence of distribution pre-arranged in the packing of the containers.

The mechanism herein described includes an elevator at the rear end of the vehicle to facilitate the handling of heavy packages.

Closed containers of any of the well known constructions having access doors at one or both ends, meet the requirements of the proposed service, so that the type of container used forms no part of this invention. For the shipment of lumber, pipe or similar material, flat platforms with or without stakes at the sides may be used.

It is realized that the use of containers has limitations and that for some types of freight they are not practical, but having the means to transfer them from a highway vehicle to rail cars safely and quickly, the described method of shipping less than car load lots of freight is of great economic value to both the railways and to highway operators, and at the same time extends the possibility of lower overall rates to shippers and consignees.

Excepting the hoisting element, the containers manipulating mechanism herein described for transferring containers may also be installed on self-propelled rail cars to transfer containers laterally from trains at their terminals, to highway vehicles of the ordinary flat platform type.

Referring to the drawings,

Figs. 1A and 1B illustrate in one form, power operated vehicles which embody this invention;

Figs. 2A and 2B show in plan the parts illustrated in Figs. 1A and 1B;

Fig. 3 is a sectional end elevation of some of the parts shown in Fig. 1B, the section being taken on the line 3—3 of the latter figure;

Fig. 4 is a transverse sectional elevation on line 4—4 of Fig. 2B, showing the highway type of vehicle resting on a transversely sloping roadway, alongside a railway car and with a container shown in several of the positions it takes when being transferred from the highway vehicle to the car;

Fig. 5 is a side elevation in section of an arrangement for automatically limiting the depression and reaction of the vehicle during a container transferring operation;

Fig. 6 is a vertical cross section of a gravity actuated control valve unit for the leveling device;

Fig. 7 is a composite drawing of the automatic platform leveling arrangement, showing the gravity actuated control valve unit in horizontal section and the lifting jacks in elevation, (one of them being shown in section). This figure also shows in horizontal section a twin valve which serves to reverse the flow of fluid through the gravity actuated control valve for a purpose which will be pointed out later, a valve for starting and stopping ascent and descent of the vehicle platform, said valve being shown in vertical section, and shows diagrammatically a pressure pump and reservoir and the pipe lines interconnecting the various parts.

In the drawings, 20 designates the chassis of a highway vehicle. In order to safely and expeditiously effect a lateral transfer of loaded containers, ten to twenty feet or more in length and weighing sometimes over twenty tons, from transport position on such a vehicle to transport position on a railway car it is necessary that the support on the vehicle for the container be brought to and maintained during the transfer at the height of the car platform, and that it be level regardless of the level of the surface under the vehicle. To this end, a container supporting frame 21 is mounted on the chassis by mechanisms which provide for it to be raised and lowered by a manually controlled device and leveler automatically.

The instrumentalities for accomplishing these results comprise four inverted cylinders 22A, 22B, 22C and 22D which are affixed to spaced parts of the frame 21. In these cylinders are oil tight pistons 23, each of which is pivotally connected to the chassis, as at 24. These are fluid pressure jacks which are actuated by oil pressure from a pump 30, the discharge pipe 31 of which is connected to a manually controlled valve 32 which is moved by connection with a control shaft 33 extending across the frame 21 and having levers 34 near its ends.

Fig. 7 shows pipes 35A, 35B, 35C, 35D leading from the cylinders through an automatic gravity actuated leveling device which will be described later, to a manifold 36 and from the manifold through pipe 37 to valve 32. Through ports in the valve, when the latter is in the position shown in Fig. 7, oil from the cylinders can flow through a pipe 38 into a reservoir 39. This will allow the frame 21 to descend until stops 25 on it contact with the chassis 20.

When it is desired to raise the frame, levers 34 are raised 90° to bring the ports in valve 32 into position to connect pipes 31 and 37, so that oil under pressure is led to the four cylinders. This will cause the frame 21 to rise. Its movement can be arrested at any time by moving levers 34 to a horizontal position, thus closing valve 32. The oil in the cylinders cannot then flow out and will maintain the frame in its raised position. The upward movement of the frame is limited by stop chains 26.

It is important that the frame 21 be level at the time the container is transferred and to attain this result an automatic gravity actuated leveling device is used. This is shown in Fig. 6 and in sectional plan view as a part of Fig. 7. It comprises a pendulum 40 which is universally pivoted at 41. Intermediate its length is a spherical enlargement 42, against which abut the ends 43 of four differential pistons 44A, 44B, 44C and 44D. The oil from the manifold 36 is led into spaces between the differential pistons. The inner parts of the differential pistons are somewhat larger than their outer parts so that the pressure in the space between these parts tends to move them inwardly into contact with the spherical enlargement 42.

The pipes 35A, 35B, 35C, 35D connect with the spaces between the differential pistons. When the parts are in the positions shown in Fig. 7 the oil will flow from the manifold 36 through these spaces and through the pipes 35A, 35B, 35C, 35D to the cylinders at a uniform rate. If the right hand end of the chassis 20 is lower than the left hand end, the pendulum 40 will swing to the right causing the differential pistons 44A and 44C to be moved outwardly. The larger parts of these pistons will close or throttle the ports to which the pipes 35A and 35C are connected, so that the flow of oil to cylinders 22A and 22C will be stopped or retarded. The result is that the right hand end of the frame will be raised while the left hand end will remain at rest or move upwardly at a slower rate.

Similarly, the pipe connections to the cylinders 22A and 22B may be shut off or throttled while those at the other side of the chassis, that is cylinders 22C and 22D, will be fully effective if the side of the chassis which is represented at the upper part of Fig. 7 is lower than the other side. This will cause the frame to reach a horizontal position and if it does before the frame has reached the desired height, the frame will continue to move upwardly in a horizontal position.

It is desirable to lock the pendulum when not in use against swinging out of its vertical position. To accomplish this the lower end 45 of the pendulum extends downwardly into the cup-shaped end 46 of a locking device which is pivoted at 47 and connected at the side of its pivot away from its cup-shaped end with a rod 48 extending downwardly from a piston 49 in a cylinder 50. Above this piston is a spring 51 which presses against the piston and raises the cup-shaped end of the locking device to engage the extension 45 of the pendulum.

It will be noted that this locking effect can be obtained only when the pendulum is in its vertical position. In order to unlock it a valve 52 is provided. This is mechanically connected to move in unison with the valve 32. 53 is a pressure pipe leading to valve 52 and 54 is a pipe interconnecting valve 52 and cylinder 50. When the control levers 34 are moved to connect the pressure pipe 31 with the manifold pipe 36 and the cylinders, valve 52 will be positioned to connect pipes 53 and 54 and the pressure then introduced under piston 49 will move the locking device away from the extension 45 of the pendulum.

When the valve 32 is moved to permit the frame to descend, the oil which flows to valve 32 through pipe 37 will be under a considerable pressure due to the weight of the frame and any load which may be upon it. Furthermore, it is desirable to permit the operator to manipulate valve 32 to control the rate at which the oil may flow through it and thus control the rate of the descent of the frame. As it is desirable to lock the pendulum before the descent of the frame is started, the valve 52 is provided so that oil from cylinder 50 can flow freely into reservoir 39 without being affected by the pressure in pipe 37. As the discharge effect of valve 52 should not be affected by a throttling manipulation of valve 32, the ports in valve 52 may be larger than those in valve 32.

The container 27 rests on skids 28 which run in channels 29 in the frame. Similar channels are provided in the platform of the railway car. These channels are brought into alinement before making a transfer.

When a transfer of a container is made to or from a truck, the action of its springs would have a tendency to disturb the level of the chassis 20 and thus the level of frame 21 in relation to that of the car platform. To prevent this, the arrangement shown in Fig. 5 is provided.

The intermediate part of springs 60 is attached to the chassis 20 and their ends attached to axle housings 61. Shackles 62 are rigidly attached to these housings. The shackles are connected by angle levers 63, pivoted to the chassis, and links 64 and 65 to piston rods which project from cylinders 66 and are guided in bearings 67. The cylinders are filled with oil which can circulate from one end of each cylinder to the other through ports 68 and valves 69 when the valves are open.

Interconnecting adjacent valves 69 is a link 70. A spring 71, (Fig. 2B) exerts a pull on link 70 to the left. The other end of each link 70 is connected by a flexible member 72 to one arm of an angle lever 73 pivotally mounted on the chassis, with its other end in the path of movement of a contact plate 74 on the frame. These parts are so arranged that when the frame stops 25 rest upon the chassis, the link 70 will be pulled to the right to keep valves 69 open to unlock the vehicle springs 60 when the frame 21 is at rest on the chassis 20. When the frame 21 is raised from the chassis, the spring 71 will pull link 70 to the left to close valves 69. This will prevent circulation of oil from one end of cylinders 66 to the other and prevent any substantial movement of the shackles 62 and lock the chassis and chassis springs against vertical movement when the pressure on the vehicle springs 60 changes.

Spring pressed plungers 75 extend upwardly from housing 76 on the chassis 20, through guides 77 on the frame 21 and above the upper surface of the frame when the latter is in its lowermost position. The upper ends of these plungers extend into flanged receptacles 78 on the containers. These prevent lateral displacement of the container on the frame of the vehicle.

When frame 21 is elevated, the receptacles 78 are raised above the plungers so that the receptacles can be moved laterally. When a container has been transferred to a vehicle frame and the frame is lowered, the receptacles 78 will engage the plungers and be held by them. If the receptacles do not at first register with the plungers, the latter will be depressed until the container is positioned properly in alinement with the plungers 75.

For transferring a container from one to another vehicle, there is secured to the underside of each container one or more series of lugs 80, Figs. 1B and 4. These lugs are slightly less in height than the height of the skids 28, as shown in Fig. 4, in order to protect them from injury by contacting with the surface on which the container supporting skids 28 rest, or during the transfer of a container from or to a vehicle or platform.

To apply power for transferring a container, there is provided one or more sprocket driven chains 81 arranged transversely of the vehicle, as shown in Figs. 1B, 2B and 4. Supported by and secured to the longitudinal members of the vertically movable platform 21 are one or more troughs 82, near the ends of which are sprocket wheels 83, 84, Fig. 4, supported on shafts in bearings 86 attached to the underside of the troughs 82. Between the sprocket wheels 83, 84 is another sprocket wheel 87 supported on a shaft 88 in bearings 89, also attached to the frame 21. In alinement with the sprocket wheel 87 are sprocket wheels 90 and 91 also mounted on the frame. The latter are pivotally and adjustably mounted on the bearings 89 for adjusting the tension in the chain 81.

Transmission of power to the sprocket chain system above described is accomplished as shown in Figs. 1A, 1B, 2A and 2B, wherein an engine 92 mounted upon the chassis 20 of the vehicle is arranged for transmitting reversible motion to the container transfer chains 81. 93 designates a power take-off unit of well known construction connected to the engine 92. Power from this unit is transmitted by sprocket wheels 94 and 95 and the chain 96 to a power reversing unit 97, also of well known construction, mounted on the chassis 20. This is connected by a deflectable shaft 98 and the universal couplings 99 and 100 to a slidable member of a normally open friction clutch 101, the opposite member of which is mounted upon the input shaft of a speed reducing unit 102. This speed reducing unit, secured to and suspended from the underside of the vertically movable frame 21 has its output shaft 103 connected with the shaft 88 by means of the sprockets 104 and 105 and the sprocket chain 106, whereby the sprocket wheels 83, 84 are driven to operate the container transferring chains 81.

A clutch shifting lever 107, for opening and closing the clutch 101, is pivotally attached between its upper and lower ends to the underside of the frame 21. At its upper end it is pivotally connected to a manual control shaft 108 by a link 109. Attached to the link 109 is a spring 110 to maintain the clutch 101 normally open. At each end of the control shaft 108 is an operating lever 111 for manually imparting partial rotation thereto for closing the clutch 101 from either side of the vehicle.

When transferring a container from a vehicle equipped in the preferred form above described, one of the pairs of lugs 112, 113 on the chain 81 will engage one of the center lugs 80 attached to the under side of the container (Fig. 4). This will move the container according to the direction of motion of the chains 81, to the right or left on the discharging vehicle until the lugs on the chain 81 which are engaged with the center lug 80 pass around the sprocket 83 or 84 and thus are disengaged from the center lug, whereupon movement of the container discontinues until the next pair of approaching chain lugs contact one of the outermost lugs 80 on the container to move the container an additional distance until the second pair of lugs on the chain are disengaged by passing around the chain sprockets. After this operation the next approaching pair of lugs on the chain engage the free end of link 117 which is hooked into a bracket 118 on the container. The container will then be moved further to its transport position indicated by dotted lines in Fig. 4, on an adjacent platform such as that of a railway car 55.

Link 117 is also used to initiate the movement of container from the car to the truck, the link being used to pull the container toward the truck into a position wherein the lugs on the chains can directly engage the lugs on the container to complete the movement. The free end of the link 117 when not engaged by the chain lugs 112, 113 rests in the trough 82 and is guided thereby. With the specific arrangement of the lugs shown there will be, in moving the body onto the truck a sufficient pause in the movement of the body after it reaches transport position on the truck to enable the operator to stop the movement of the chains.

It is to be understood that it is within the scope of this invention to vary the number of lugs on either the chain or the body as only one on each is necessary for direct engagement with the container and for imparting movement to the container through the intermediary of a link.

In service the highway type of side loading vehicle is operated as follows: Upon spotting the vehicle approximately two feet away from and substantially parallel to one side of a railway car, the chassis of the vehicle is anchored to the frame of the railway car by chains attached to the platform 21 and car at 135 and 136. Next, the ports of the hydraulic control valves 32 and 52 being closed, a lever 137 in the cab of the vehicle is moved in the proper direction to mesh the gears of the reversing unit 97 to rotate the shaft 93 in the direction desired. Then a lever 138 is moved in the proper direction to mesh the power take-off gear in the unit 93 with the power gear of the engine 92, the operator allowing the engine to idle in neutral, then releases the clutch lever whereupon the slidable member of the clutch 101 and the pump 30 are set in motion, and rotary motion is thereby made available to the hoisting unit if and when desired.

As previously stated, prior to transferring a container, it may be necessary to level and elevate the frame 21 to the height of the platform of the railway car. To accomplish such adjustment, one of the levers 34 secured to the shaft 33 is raised to open valves 32 and 52, whereupon the platform begins to ascend level under the control of the gravity actuated control valves previously described. As soon as the frame releases the levers 73 on the chassis frame 20, the springs 71 close the valves of the vehicle spring locking mechanism.

Immediately the frame 21 attains the desired height it is secured at said height by turning the valve control shaft 33 to its neutral position. The operator then, by applying slight pressure of the hand to one of the levers 111, will close the friction clutch 101 to cause the container to be discharged from the vehicle. After a container has been discharged the frame 21 may be lowered until its stops 25 seat on the chassis 20 which automatically returns the action of the vehicle springs to normal.

It is of course possible to make many modifications in construction and design of the mechanism herein shown and described and I intend no limitations other than those imposed by the appended claims.

What I claim is:

1. A vehicle of the class described having a chassis and wheels below the chassis, springs between the chassis and the wheels, a frame on the chassis, arranged to support a transferrable body, a locking member projecting upwardly from the chassis through the frame to engage the body, means for raising the frame above the upper end of the locking member, and means controlled by the raising of the frame for locking the springs.

2. A vehicle of the class described having a chassis and wheels below the chassis, springs between the chassis and the wheels, a frame on the chassis, arranged to support a transferrable body, means for elevating the frame above the chassis, means for automatically controlling the elevating means to maintain said frame substantially horizontal during its elevation, and means controlled by the raising of the frame for locking the springs.

3. A vehicle of the class described having a chassis and wheels below the chassis, springs between the chassis and the wheels, a frame on the chassis, arranged to support a transferrable body, means for elevating the frame above the chassis, means for automatically controlling the elevating means to maintain said frame substantially horizontal during its elevation, means for locking the springs against vertical movement when the frame is elevated, and automatic means for unlocking the springs when the frame is at rest on the chassis.

4. A vehicle of the class described having a chassis, wheels below the chassis, axles for the wheels and springs interconnecting the axles and the chassis, a vertically movable load supporting frame on the chassis, means on the vehicle for locking the body against lateral movement, means for locking the springs against vertical movement, and means for raising the frame above the chassis and means actuated by the vertical movement of the frame for releasing the body locking means and actuating the spring locking means.

5. A vehicle of the class described having a chassis, wheels below the chassis, axles for the wheels and springs interconnecting the axles and the chassis, a vertically movable load supporting frame, a fluid tight cylinder on the chassis, a piston in the cylinder, a mechanical connection between the piston and an axle, a fluid by-pass between opposite ends of the cylinder, and means controlled by the movement of the frame for closing said by-pass to prevent movement of the piston and vertical movement of the springs.

6. A vehicle of the class described having a chassis, a vertically movable load supporting frame above the chassis, fluid pressure means for raising and automatically leveling the frame transversely and longitudinally in relation to the chassis, said means comprising a pendulum supported on the frame, and a plurality of fluid control valves arranged to be actuated by movements of said pendulum.

7. A vehicle of the class described having a chassis, a vertically movable load supporting frame above the chassis, fluid pressure means for raising and automatically leveling the frame transversely and longitudinally in relation to the chassis, said means comprising a pendulum supported on the frame, and a plurality of fluid control valves angularly spaced around the pendulum and arranged to be actuated by movements of said pendulum.

8. A vehicle having a chassis, a frame thereon for supporting loads, means on the frame for horizontally moving a load supported on the frame, a load locking member projecting upwardly through the frame, and means for raising the frame above the upper end of the load locking member.

9. A vehicle having a chassis, a frame thereon for supporting loads, means on the frame for horizontally moving a load supported on the frame, a load locking member resiliently supported on the frame and projecting upwardly through the frame, and means for raising the frame above the upper end of the load locking member.

10. A vehicle of the class described having a chassis and wheels below the chassis, springs between the chassis and the wheels, a frame on the chassis, guides on the frame for supporting a removable body, a locking member projecting upwardly from the chassis through the frame to engage the body, means for raising the frame above the upper end of the locking member, power operated means for moving the body along the guides to or from an adjacent platform, and means on the chassis for locking the springs until the body has been completely transferred.

11. A vehicle of the class described having a chassis, spaced guides on the chassis arranged to support a transferrable body, a plurality of angularly disposed spaced raising mechanisms for bringing the spaced guides to a substantially horizonal position in the same plane when the vehicle is at rest out of level, a pendulum suspended from the vehicle to swing freely in any direction when the vehicle shifts out of level, and two diagonally disposed pairs of control devices connected with said raising mechanisms, said pendulum being interposed between said control devices.

12. A vehicle of the class described having a chassis, a frame on the chassis, a plurality of angularly disposed spaced mechanisms on the vehicle for raising the frame above the chassis, a pendulum suspended from the vehicle to swing freely in any direction when the vehicle shifts out of level, and two diagonally disposed pairs of control devices, said pendulum being interposed between said control devices, each of said control devices being connected to one of the raising mechanisms to automatically maintain the entire frame in a substantially horizontal plane when the vehicle is at rest out of level.

13. A vehicle of the class described having a chassis, a load supporting frame on the chassis, mechanism on the frame for elevating the frame above the chassis, said mechanism comprising a plurality of angularly disposed spaced raising units, a power generator on the vehicle, flexible connections between the power generator and said raising units, a pendulum suspended from the vehicle to swing freely in any direction when the vehicle shifts out of level, and two diagonally disposed pairs of control devices in said flexible connections, said pendulum being interposed between said control devices to automatically maintain the entire frame in a substantially horizontal plane when the vehicle is at rest out of level.

HAROLD W. SHONNARD.